Patented Sept. 25, 1945

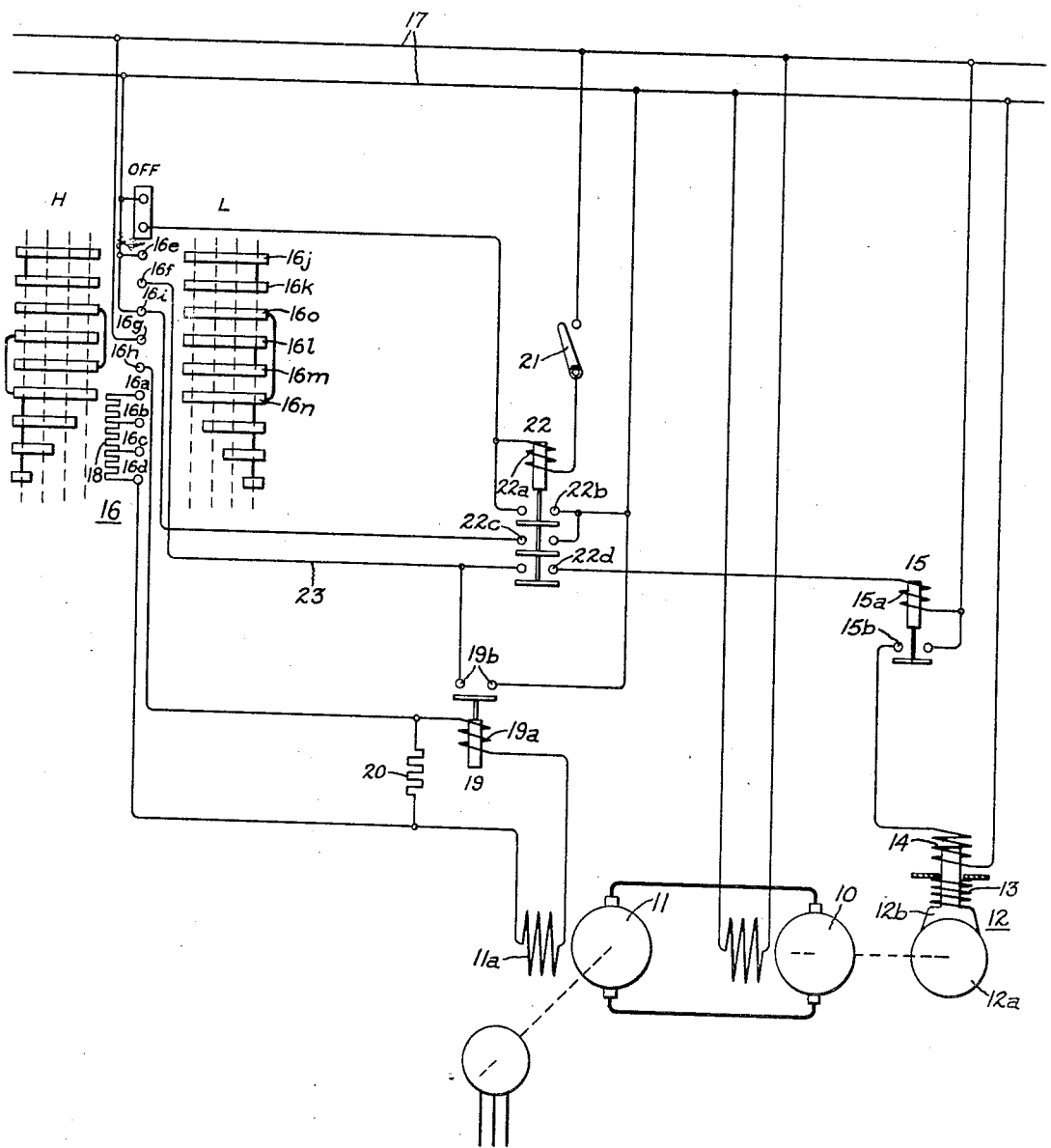

2,385,671

UNITED STATES PATENT OFFICE 2,385,671

CONTROL SYSTEM

Max A. Whiting, Schenectady, N. Y., assignor to General Electric Company, a corporation of New York Application March 3, 1944, Serial No. 524,931

7 Claims. (Cl. 172—179)

This invention relates to control systems, more particularly to control systems for electric motors, and it has for an object the provision of a simple, reliable, and improved control system of this character.

Still more particularly, the invention relates to motor control systems in which the motor is supplied from an adjustable voltage generator under the control of a master switch and in which a mechanical brake, also under the control of the master switch, is provided for the motor. In systems of this character, return of the master switch to the off position disconnects the generator field from the excitation source and allows the mechanical brake to set. Since the generator field decays somewhat gradually, the mechanical brake in a conventional arrangement sets at a substantial fraction of full generator voltage; in fact it may set at almost maximum generator voltage. Under this condition, the brake torque and the otherwise available regenerative retarding torque are not fully additive. On the contrary, if the brake torque is substantially greater than that required to hold the live load, the mechanical brake will cause the latter part of the retardation to occur at a much faster rate than that of the decay of the generator field. Consequently, regeneration ceases, and during the latter part of the retardation, the generator is delivering current to the motor to rotate it against the torque of the mechanical brake. This disadvantageous phenomenon often occurs to such a substantial degree as to effect excessive heating, heavy wear of the brake shoes, and excessive sparking at the brushes of both the motor and the generator. Thus, a further object of the invention is the provision of means for minimizing heat and wear of the brake shoes and sparking at the brushes.

In carrying the invention into effect, in one form thereof, a master switch is provided for controlling the excitation of the generator field and for controlling the release of the brake. Additionally, means responsive to the current in the generator field are provided for preventing the setting of the brake in response to the return of the master switch to the off position, until the generator field has decayed to a predetermined low value.

For a better and more complete understanding of the invention, reference should now be had to the following specification and to the accompanying drawing of which the single figure is a simple, diagrammatical representation of an embodiment of the invention.

Referring now to the drawing, a D.-C. motor 10 is supplied from an adjustable voltage generator 11 of which the armature is connected in a loop circuit with the armature of the motor. The generator 11 is driven at a speed, which is preferably substantially constant by suitable means, such as an induction motor. The motor 10 may drive any suitable load (not shown). For example, it may be assumed that the motor 10 is the hoist motor of a hoisting system.

For the purpose of holding the motor and the load at standstill, a mechanical brake 12 is provided; this brake comprises a brake drum 12a mounted on the motor shaft and a brake shoe 12b which cooperates with the brake drum to produce a braking torque. The brake shoe 12b is biased against the drum 12a by any suitable means such as the spring 13, or by a weight (not shown). For releasing the brake, suitable means are provided such, for example, as the solenoid 14 which has sufficient pull to overcome the force of the spring 13 and withdraw the brake shoe 12b from engagement with the brake drum 12a.

The brake 12 will have adequate braking torque to hold the maximum live load to which the motor 10 will be subjected.

The energization of the brake solenoid 14 is controlled by suitable switching means such as the electromagnetic contactor 15 which, in turn, is controlled by suitable means such as the master switch 16. Although the master switch 16 may be of any suitable type, it is illustrated as a manually operated, multiposition, reversing type drum switch.

The supply generator 11 is provided with a field winding 11a which is excited from a suitable source of excitation such as represented by the D.-C. excitation buses 17. The connection of the field winding 11a to the source 17 is under the control of the master switch 16. For the purpose of adjusting the voltage of the generator 11, thereby to adjust the speed of the motor 10, a variable resistor 18 is connected in series relationship in circuit with the field winding 11a. Taps are brought out from the resistor to the fingers 16a, 16b, 16c and 16d of the master switch to provide for varying the resistor in response to operation of the master switch from its off position through successive running positions in either direction.

For the purpose of preventing the brake 12 from setting before the generator field has decayed to a predetermined low value in response to operation of the master switch from a running position to the off position, suitable means such as the relay 19 are provided for controlling the setting of the brake in response to the current in the field winding. This relay may be a properly selected, standard relay having a coil specification to suit the individual generator field current. It picks up at a comparatively low fraction of maximum generator field current and drops out at a still lower current. A nonmagnetic shim (not shown) may be used in the air gap of the relay to assure that the relay cannot be "frozen" closed by residual magnetism. The operating coil 19a of the relay is connected directly in series relationship with the field winding 11a so that the current in the relay coil is the actual current of the generator field. A discharge resistor 20 is connected across the field winding 11a and the relay winding 19a.

The contacts 19b of the relay 19 are connected in a holding circuit for the operating coil 15a of the brake contactor 15. When the relay 19 is picked up and its contacts closed, the holding circuit for the operating coil 15a is completed independently of the master switch 16 so that the brake contactor 15 will remain picked up after the master switch 16 has been returned from a running position to the off position. A number of switching devices may appropriately be provided for initiating an emergency stop. Such emergency switching devices are represented in the drawing by the single switching device 21. As shown, the contacts of the emergency switch device 21 are connected in series with the exciting winding of under-voltage protection contactor 22, whereby upon the opening of contacts 21, contactor 22 drops out. It will be seen by tracing the circuits that when contactor 22 drops out it causes brake contactor 15 to drop out immediately so that in an emergency stop the setting of the brake is not delayed.

With the foregoing understanding of the elements and their organization, the operation of the system itself will readily be understood from the following detailed description. The contacts of the emergency stop switching device 21 are normally in the closed position. With the master switch in the off position in which it is illustrated, the motor 10 is at rest and the brake 12 is set by means of the spring 13. Also an energizing circuit is completed for the operating coil 22a of undervoltage protection contactor 22, which, in response to energization picks up and closes its normally open contacts 22b, 22c, and 22d.

Movement of the master switch 16 from the off position to the first running position completes an energizing circuit for the operating coil 15a of the brake contactor which is readily traced from the lower D.-C. line 17, fingers 16e and 16f of the master switch bridged by the segments 16j and 16k which are electrically connected together, conductor 23, operating coil 15a to the upper D.-C. line 17. In response to energization, the brake contactor 15 picks up and closes its contacts 15b to complete an energizing circuit for the brake solenoid 14 across the source 17. The solenoid 14, responsively to energization, releases the brake shoe 12b from the drum 12a against the force of the setting spring 13.

Simultaneously, the connection of the generator field winding 11a to the source 17 is completed through the master switch. This circuit is traced from the upper D.-C. line 17, through the finger 16g, segments 16L and 16m which are connected together, finger 16h, operating coil 19a, field winding 11a, finger 16d, resistance 18, segments 16n and 16o which are connected together, and finger 16i to the lower D.-C. line 17.

Since the full amount of the resistor 18 is effective in the field circuit at this time, the voltage of the generator rises to a low value and the motor 10 is accelerated to a correspondingly low speed.

Moving the master switch 16 through its successive operating positions causes the field resistor 18 to be short circuited in successive steps. As a result, the field of the generator 11 is correspondingly strengthened and the speed of the motor accelerated to successively higher values. At a point in the movement of the master switch at which the field current has built up to a substantial value, the relay 19 picks up to close its contacts 19b and thereby complete a holding circuit for the operating coil 15a of the brake contactor which is independent of the contacts of the master switch.

If now the master switch, having been at a substantial speed position, is moved quickly to the off position, the relay 19 remains picked up until the generator field has decayed to a very low value. While the relay 19 remains picked up, the brake contactor 15 also remains picked up, with the result that the brake solenoid 14 is maintained energized and the brake shoe 12b held released against the force of the setting spring 13.

As the field of the generator 11 decays, its voltage decreases correspondingly. Since the field of the motor 10 remains fully energized, its countervoltage exceeds the voltage generated by the generator, with the result that the motor 10 acts as a generator and supplies current to the generator 11 which now acts as a motor. This regeneration produces a very strong regenerative braking torque which effectively retards the speed of the motor 10 to a low value.

At a predetermined low value of generated field current, at which the motor 10 has been retarded to a correspondingly relatively low speed, the relay 19 drops out and opens its contacts 19b to interrupt the holding circuit for the operating coil 15a of the brake contactor. Responsively to deenergization, the contactor 15 drops out and deenergizes the brake solenoid 14, thereby permitting the spring 13 to set the brake shoe 12b against the drum 12a, thereby completing the retardation of the motor 10. By the time the brake has set, the generator field is little more than zero, so that little, if any, current is supplied by the generator 11 to the motor 10 when the brake is set. Thus, there is little or no tendency of the motor 10 to rotate against the force of the mechanical brake, and excessive heating and wear of the brake shoes and destructive arcing at the commutators are substantially eliminated.

When the master switch is moved from the off position to the first running position and is then returned to the off position, the speed of the motor 10 is so low that a delay in the brake setting is unnecessary and tends to be undesirable. Correspondingly, the small value of generator field current attained at the first speed is insufficient to pick up the relay 19, so that the undesired delay of brake setting under this condition does not occur.

If undervoltage protection contactor 22 is dropped out, for example by the opening of an emergency switching device such as 21, the opening of its contacts 22d causes the brake contactor 15 to drop out, which causes the brake to set. Simultaneously the opening of its contacts 22c opens the excitation supply to the master switch, whereby the generator excitation is caused to decay to zero. Also, the simultaneous opening of its contact 22b opens the holding circuit for the operating coil 22d additionally to the opening already effected by switching device 21. Consequently, if the master switch remains upon a running position, the reclosure of switching device 21 cannot itself cause contactor 22 to pick up. However, upon the return of the master switch to the off position it closes a circuit by which contactor 22 picks up if excitation is available.

In the picked-up position, contactor 22 re-establishes a holding circuit for itself independently of the off position of the master switch and also re-establishes the two circuits by which the generator field and the pick-up of the brake contactor 15 are again placed under the control of the master switch.

Although in accordance with the provisions of the patent statutes this invention is described as embodied in concrete form, and the principle thereof has been explained together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. A control system comprising in combination an electric motor, braking means for said motor, means for biasing said braking means to the braking position, means for supplying a voltage to said motor comprising a generator provided with a field winding, a master switch having an off position and a running position for controlling the excitation of said field winding, means responsive to operation of said master switch to said running position for releasing said brake, and means responsive to the current in said generator field winding for preventing said biasing means from setting said brake in response to return of said master switch to said off position until said generator field current has decayed to a predetermined low value.

2. A control system comprising in combination, an electric motor, braking means for said motor, means for supplying a voltage to said motor comprising a generator provided with a field winding, means for varying the excitation of said field winding to vary the speed of said motor, and means for initiating the actuation of said braking means to brake said motor at a predetermined low speed of said motor comprising an electromagnetic switching device having its operating coil connected in series relationship with said field winding to be responsive to the current in said winding.

3. A control system comprising in combination an electric motor, a brake for said motor, means for applying said brake, means for supplying a voltage to said motor comprising a generator provided with a field winding, a master switch having an off position and a running position for controlling the excitation of said field winding, means responsive to operation of said master switch to said running position for releasing said brake, and an electromagnetic switching device having its operating coil connected in series relationship with said field winding for preventing said applying means from applying said brake in response to return of said master switch to said off position until said generator field current has decayed to a predetermined low value.

4. A control system comprising in combination, an electric motor, a brake for said motor, means for supplying a voltage to said motor comprising a generator provided with a field winding, a master switch having an off position and a running position for controlling the excitation of said field winding, an electromagnetic contactor responsive to operation of said master switch to said running position for effecting release of said brake, and an electromagnetic switching device responsive to the current in said field winding for preventing said contactor from effecting the application of said brake following return of said master switch to said off position until said field current has decayed to a predetermined value.

5. A control system comprising in combination, an electric motor, a brake for said motor, means for supplying a voltage to said motor comprising a generator provided with a field winding, a master switch having an off position and a running position for controlling the excitation of said field winding, an electromagnetic contactor having an operating coil energized in response to operation of said master switch to said running position for effecting release of said brake, and a relay having its operating coil connected in series relationship with said field winding and responsive to the current in said field winding for establishing a holding circuit for said contactor operating coil independent of said master switch thereby to maintain said contactor energized and said brake released following return of said master switch to said off position until said field current has decayed to a predetermined value.

6. A control system comprising in combination, an electric motor, a brake for said motor, means for supplying a voltage to said motor comprising a generator provided with a field winding, a master switch having an off position and a running position for controlling the excitation of said field winding, an electromagnetic contactor having an operating coil energized in response to operation of said master switch to said running position for effecting release of said brake, a relay having its operating coil connected in series relationship with said field winding and responsive to the current in said field winding for establishing a holding circuit for said contactor operating coil independent of said master switch thereby to maintain said contactor energized and said brake released following return of said master switch to said off position until said field current has decayed to a predetermined value, and means responsive to an emergency condition of said system for interrupting said holding circuit to provide for undelayed setting of said mechanical brake.

7. A control system comprising in combination an electric motor, braking means for said motor, means for supplying a voltage to said motor comprising a generator provided with a field winding, a multi-position master switch having an off position, a low speed running position and a high speed running position, means controlled by said master switch for limiting the current in said field winding to a relatively low value in response to operation of said master switch to said low speed position and for increasing said field current to a relatively high value in response to operation of said switch to said high speed position, means controlled by said master switch in the off position for applying said brake, means responsive to operation of said master switch to any of said running positions for releasing said brake, and an electroresponsive device responsive to said relatively high value of generator field current for delaying the application of said brake in response to return of said master switch from said high speed position to said off position until said field current has decayed to a predetermined low value and unresponsive to said relatively low value of generator field current thereby to provide for setting of said brake without delay in response to return of said master switch to said off position from said low speed position in an operation in which said generator field current has not exceeded said relatively low value.

MAX A. WHITING.